USO10000277B2

(12) United States Patent
Tiwari et al.

(10) Patent No.: US 10,000,277 B2
(45) Date of Patent: Jun. 19, 2018

(54) PERFORATED SURFACE FOR SUCTION-TYPE LAMINAR FLOW CONTROL

(71) Applicant: Rohr, Inc., Chula Vista, CA (US)

(72) Inventors: Sean Tiwari, Glendora, CA (US); Luby Weaver, Redlands, CA (US)

(73) Assignee: Rohr, Inc., Chula Vista, CA (US)

( * ) Notice: Subject to any disclaimer, the term of this patent is extended or adjusted under 35 U.S.C. 154(b) by 711 days.

(21) Appl. No.: 14/516,200

(22) Filed: Oct. 16, 2014

(65) Prior Publication Data

US 2016/0107746 A1    Apr. 21, 2016

(51) Int. Cl.

| | |
|---|---|
| *B64C 21/06* | (2006.01) |
| *B23K 26/382* | (2014.01) |
| *B32B 3/26* | (2006.01) |
| *B32B 15/08* | (2006.01) |
| *B64C 7/02* | (2006.01) |
| *F15D 1/00* | (2006.01) |

(Continued)

(52) U.S. Cl.
CPC ............ *B64C 21/06* (2013.01); *B23K 26/382* (2015.10); *B32B 3/266* (2013.01); *B32B 15/08* (2013.01); *B64C 7/02* (2013.01); *F15D 1/008* (2013.01); *B32B 2262/00* (2013.01); *B32B 2571/00* (2013.01); *B32B 2605/18* (2013.01); *B64D 2033/0226* (2013.01); *F15D 1/12* (2013.01); *Y02T 50/166* (2013.01)

(58) Field of Classification Search
CPC ......... B64C 21/00; B64C 21/02; B64C 21/06; B64D 2033/0226

See application file for complete search history.

(56) References Cited

U.S. PATENT DOCUMENTS 2,742,247 A *  4/1956  Lachmann .............. B64C 21/06
                                                    114/20.1
2,833,492 A *  5/1958  Fowler ................... B64C 21/06
                                                    244/209

(Continued)

FOREIGN PATENT DOCUMENTS

| EP | 0536874 A1 * | 4/1993 | ............. B64C 21/06 |
| EP | 2687439 A1 * | 1/2014 | ............. B64C 21/06 |

(Continued)

OTHER PUBLICATIONS

MacManus et al.; Micro-scale three-dimensional Navier-Stokes investigation of laminar flow control suction hole configurations; Jan. 1996; American Institute of Aeronautics and Astronautics, Inc.; AIAA Paper 96/0544.*

(Continued)

*Primary Examiner* — Tien Q Dinh
*Assistant Examiner* — Michael A. Fabula
(74) *Attorney, Agent, or Firm* — O'Shea Getz P.C.

(57) ABSTRACT

An apparatus is provided for promoting laminar flow. The apparatus includes a panel extending between an interior surface and an exterior air flow surface. The panel includes a plurality of macro apertures and a plurality of micro apertures. A first one of the macro apertures extends into the panel from the interior surface. A first one of the micro apertures extends into the panel from the exterior air flow surface and is fluidly coupled with the first one of the macro apertures.

16 Claims, 7 Drawing Sheets

(51) Int. Cl.
*F15D 1/12* (2006.01)
*B64D 33/02* (2006.01)

(56) References Cited

U.S. PATENT DOCUMENTS

| | | | | |
|---|---|---|---|---|
| 2,867,392 A * | 1/1959 | Lear | B64C 21/06 | 244/209 |
| 3,128,973 A * | 4/1964 | Dannenberg | B64C 21/06 | 244/130 |
| 3,203,648 A * | 8/1965 | Aram | B64C 21/06 | 244/209 |
| 3,521,837 A * | 7/1970 | Papst | B64C 21/06 | 244/130 |
| 3,612,446 A * | 10/1971 | Lebert | B64C 21/02 | 244/1 N |
| 4,258,889 A * | 3/1981 | Hunt | B64C 21/06 | 156/293 |
| 4,749,150 A * | 6/1988 | Rose | B64C 21/06 | 181/214 |
| 4,802,642 A | 2/1989 | Mangiarotty | | |
| 4,807,831 A * | 2/1989 | Brewer | B64C 1/38 | 244/117 A |
| 4,813,631 A * | 3/1989 | Gratzer | B64C 9/146 | 244/209 |
| 5,167,387 A * | 12/1992 | Hartwich | B64C 21/025 | 244/200 |
| 5,263,667 A * | 11/1993 | Horstman | B64C 21/06 | 244/130 |
| 5,590,854 A * | 1/1997 | Shatz | B64C 1/12 | 244/130 |
| 5,591,511 A * | 1/1997 | Yasui | B21D 26/055 | 244/207 |
| 5,618,363 A * | 4/1997 | Mullender | B29C 33/52 | 156/155 |
| 5,653,836 A * | 8/1997 | Mnich | B29C 73/02 | 156/98 |
| 5,741,456 A * | 4/1998 | Ayrton | B29C 70/545 | 181/292 |
| 5,743,488 A * | 4/1998 | Rolston | B64C 21/025 | 181/214 |
| 5,758,823 A * | 6/1998 | Glezer | B64C 21/08 | 239/11 |
| 5,772,156 A | 6/1998 | Parikh et al. | | |
| 5,779,196 A | 7/1998 | Timar | | |
| 5,944,287 A * | 8/1999 | Rodgers | B64C 21/06 | 244/134 C |
| 6,752,358 B1 * | 6/2004 | Williams | B64C 1/12 | 244/208 |
| 7,048,230 B2 * | 5/2006 | Meyer | B64D 33/02 | 244/130 |
| 7,673,832 B2 * | 3/2010 | Meister | B64C 21/025 | 244/123.1 |
| 7,766,280 B2 * | 8/2010 | Cloft | B64D 33/02 | 244/208 |
| 7,866,609 B2 * | 1/2011 | Parikh | B64C 21/06 | 244/209 |
| 7,922,126 B2 * | 4/2011 | Meister | B64C 21/025 | 244/123.12 |
| 8,128,037 B2 | 3/2012 | Powell et al. | | |
| 8,245,976 B2 | 8/2012 | Sakurai et al. | | |
| 8,282,037 B2 * | 10/2012 | Jain | B64D 29/00 | 244/207 |
| 8,484,894 B2 | 7/2013 | Sakurai et al. | | |
| 8,567,467 B2 | 10/2013 | Maheshwari et al. | | |
| 8,783,624 B2 | 7/2014 | Koppelman et al. | | |
| 2001/0022152 A1 * | 9/2001 | Takahashi | B63B 1/34 | 114/67 A |
| 2002/0153361 A1 * | 10/2002 | Sakamoto | B23K 26/0608 | 219/121.73 |
| 2003/0042657 A1 * | 3/2003 | Dublineau | B23K 26/08 | 264/400 |
| 2005/0151026 A1 * | 7/2005 | Meyer | B64D 33/02 | 244/204 |
| 2009/0045009 A1 * | 2/2009 | Chiou | G10K 11/168 | 181/290 |
| 2009/0212165 A1 * | 8/2009 | Parikh | B64C 21/06 | 244/209 |
| 2009/0266937 A1 * | 10/2009 | Frankenberger | B64C 21/06 | 244/209 |
| 2012/0187252 A1 * | 7/2012 | Gerber | B64C 5/06 | 244/209 |
| 2015/0306815 A1 * | 10/2015 | Braden | B29C 59/16 | 156/272.8 |
| 2016/0144949 A1 * | 5/2016 | Kestler | B64D 33/02 | 244/53 B |

FOREIGN PATENT DOCUMENTS

| | | | | |
|---|---|---|---|---|
| WO | WO 0100488 A1 * | 1/2001 | | B64C 1/12 |
| WO | WO 2011039285 A3 * | 7/2011 | | B64C 5/06 |

OTHER PUBLICATIONS

"Hybrid Laminar Flow Technology (HYLTEC)", European Commission, Jun. 30, 2001.
Albert L. Braslow, "A History of Suction-Type Laminar-Flow Control with Emphasis on Flight Research", Monographs in Aerospace History #13, 1999.
Anthony Washburn, "Drag Reduction Status and Plans—Laminar Flow and AFC", AIAA Aero Sciences Meeting, Jan. 4-7, 2011.
Ronald D. Joslin, "Overview of Laminar Flow Control", NASA/TP-1998-208705, Oct. 1998.
John E. Green, "Laminar Flow Control—Back to the Future?", 38th Fluid Dynamics Conference and Exhibit, Jun. 23-26, 2008.
Joseph R. Chambers, "Innovation in Flight: Research of the NASA Langley Research Center on Revolutionary Advanced Concepts for Aeronautics", NASA SP-2005-4539, Aug. 22, 2005.
Ronald D. Joslin, "Aircraft Laminar Flow Control", Annual Review of Fluid Mechanics 1998: vol. 30, 1-29.
EP search report for EP15190074.3 dated Dec. 16, 2015.
Jason Paur, "Boeing Adds Tiny Holes to its Biggest Plane to Boost Efficiency", Technology, Nov. 20, 2013.
Pulley et al. "NASA X Future Forward-ERA", www.nasa.gov/nasax/nasa-x-future-forward-era/, May 29, 2014.
Steve Wilhelm, "Powerwash Gets the Bugs Off Boeing's Secret 787-9 Laminar Flow System", Puget Sound Business Journal, May 7, 2014.
Steve Wilhelm, "How Could 777x Gain Efficiency Edge? Top Exec Hints at Tiny Air Holes in Rear Vertical Fin", Puget Sound Business Journal, Mar. 17, 2014.

* cited by examiner

PERFORATED SURFACE FOR SUCTION-TYPE LAMINAR FLOW CONTROL

BACKGROUND OF THE INVENTION

1. Technical Field

This disclosure relates generally to a perforated flow body surface through which suction may occur in order to maintain laminar flow of a fluid on the surface of the body, and methods for forming such perforated surfaces.

2. Background Information

Achieving laminar flow over aircraft aerodynamic surfaces has been a goal for many decades because, in general, laminar flow over an aerodynamic surface results in reduced drag compared to turbulent flow over the same surface. Two strategies include natural laminar flow and active laminar flow control.

Natural laminar flow (NLF) is produced by shaping the aerodynamic surfaces in a manner such that laminar flow naturally occurs and is maintained along the extent of the aerodynamic surface during all or during targeted flight conditions. NLF is desirable because it does not require any additional hardware or controls. However, it is not practical to shape certain aerodynamic surfaces to achieve NLF.

Active laminar flow control (ALFC) involves modifying the air flow over an aerodynamic surface so that laminar flow, which occurs over the leading edge, is maintained over the extent of the surface by preventing a trip to turbulent flow. The modification to the air flow for ALFC can take different forms, one of which involves continuously removing low energy air from boundary layer along the extent of the flow surface to prevent the boundary from thickening and eventually tripping to turbulent flow. This has been proposed through using many small holes closely spaced and generally evenly distributed along and across the flow surface with suction to pull air from the boundary layer into the holes in a generally continuous fashion.

While ALFC through suction removal of the boundary layer has been proposed for many decades, it has not been commercially implemented due to several problems. One problem is the cost of forming the many very small, closely spaced and distributed holes on the air flow surface. This disclosure addresses, among other things, the problem of how to economically form these holes in a repeatable, controllable manufacturing process in the types of materials and in the structures commonly used for aircraft aerodynamic surfaces.

SUMMARY OF THE DISCLOSURE

According to an aspect of the invention, an apparatus for promoting laminar flow is provided. This apparatus includes a panel extending between an interior surface and an exterior air flow surface. The panel includes a plurality of macro apertures and a plurality of micro apertures. A first one of the macro apertures extends into the panel from the interior surface. A first one of the micro apertures extends into the panel from the exterior air flow surface and is fluidly coupled with the first one of the macro apertures.

According to another aspect of the invention, a method is provided for manufacturing an apparatus for promoting laminar flow. The method includes a step of forming a plurality of macro apertures and a plurality of micro apertures into a panel. The panel extends between an interior surface and an exterior surface. A first one of the macro apertures extends into the panel from the interior surface. A first one of the micro apertures extends into the panel from the exterior surface, and is fluidly coupled with the first one of the macro apertures.

A set of the micro apertures may extend into the panel from the exterior (e.g., air flow) surface and may be fluidly coupled with the first one of the macro apertures. The set of the micro apertures may include the first one of the micro apertures.

The first one of the macro apertures may have a width that is at least ten times greater than a width of the first one of the micro apertures.

The first one of the macro apertures may fluidly couple the first one of the micro apertures with a duct included with the apparatus.

A vacuum source may be included and configured to draw boundary layer fluid adjacent the exterior (e.g., air flow) surface serially through the first one of the micro apertures and the first one of the macro apertures.

The panel may include or otherwise be configured from composite material and/or metal.

The panel may include a first layer attached to a second layer. The first one of the macro apertures may extend through the first layer. The first one of the micro apertures may extend through the second layer.

The first layer may be configured as or otherwise include a multi-ply laminate.

The second layer may be configured as or otherwise include fibrous material with a resin matrix, a surface film and/or lightning strike protection.

The panel may be configured as a turbine engine propulsion system panel.

The panel may be configured as a nacelle outer barrel panel.

The panel may be configured as an aircraft panel.

The step of forming may include forming at least one of the first one of the macro apertures or the first one of the micro apertures using a laser.

The laser may be configured to percussion laser drill the micro apertures and/or trepan laser drill the macro apertures.

The macro apertures may be formed in a first layer of material. The micro apertures may be formed in a second layer of material. The second layer of material may also be bonded over the first layer of material.

The foregoing features and the operation of the invention will become more apparent in light of the following description and the accompanying drawings.

DETAILED DESCRIPTION OF THE INVENTION

Figure 1:
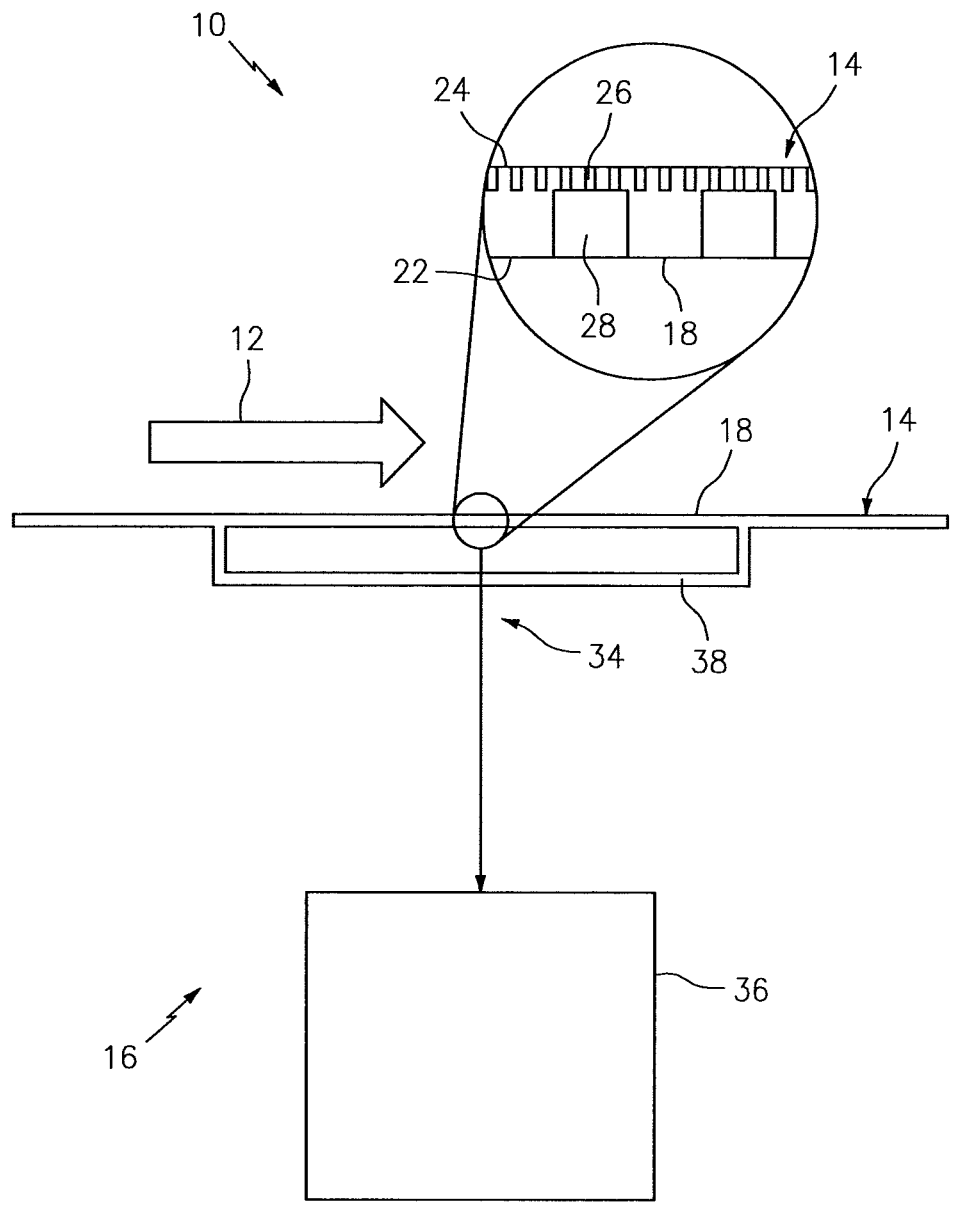
FIG. 1 is a schematic illustration of an active laminar flow control system utilizing an air flow surface with perforations formed according to the present invention.

FIG. 1 is a schematic illustration of active laminar flow control system 10 for promoting laminar flow of a fluid 12 over an air flow body 14 having perforations formed therein according to the present invention. The system 10 may promote such laminar flow by reducing boundary layer thickness, or reducing boundary layer growth of the fluid flow 12 against the body 14. Reducing boundary layer thickness may prevent or delay development of turbulent flow over the air flow body 14 and thereby reduce surface flow drag.

For ease of description, the fluid flow 12 is described below as an airflow and the body 14 is described as a component of an aircraft. The present disclosure, however, is not limited to any particular types of fluid or body configurations. For example, the fluid flow 12 may be any type of liquid fluid flow, any type of gaseous fluid flow or a combination thereof. The body 14 may be any fluid dynamic body that interacts with and/or moves through a fluid flow.

Figure 2:
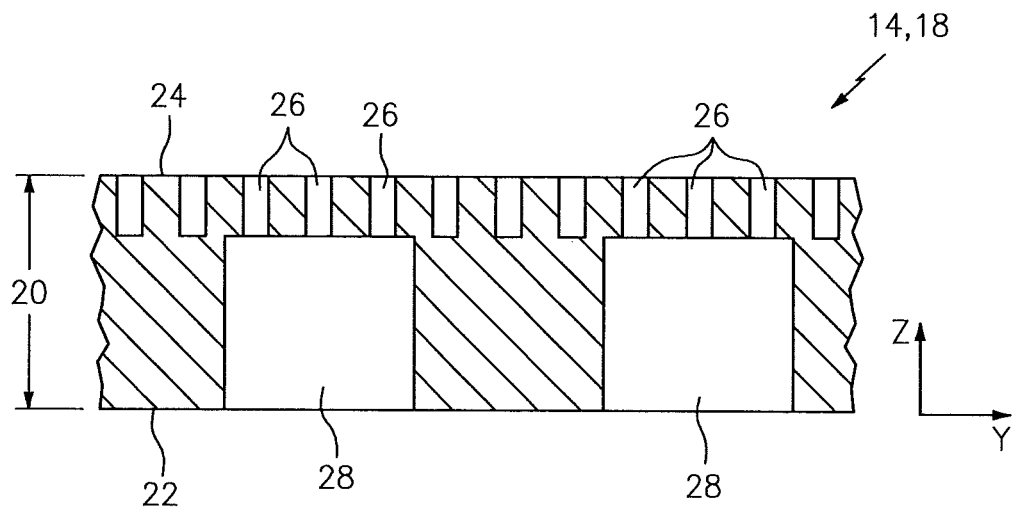
FIG. 2 is a sectional schematic illustration of a portion of a panel illustrated in FIG. 1.
Figure 3:
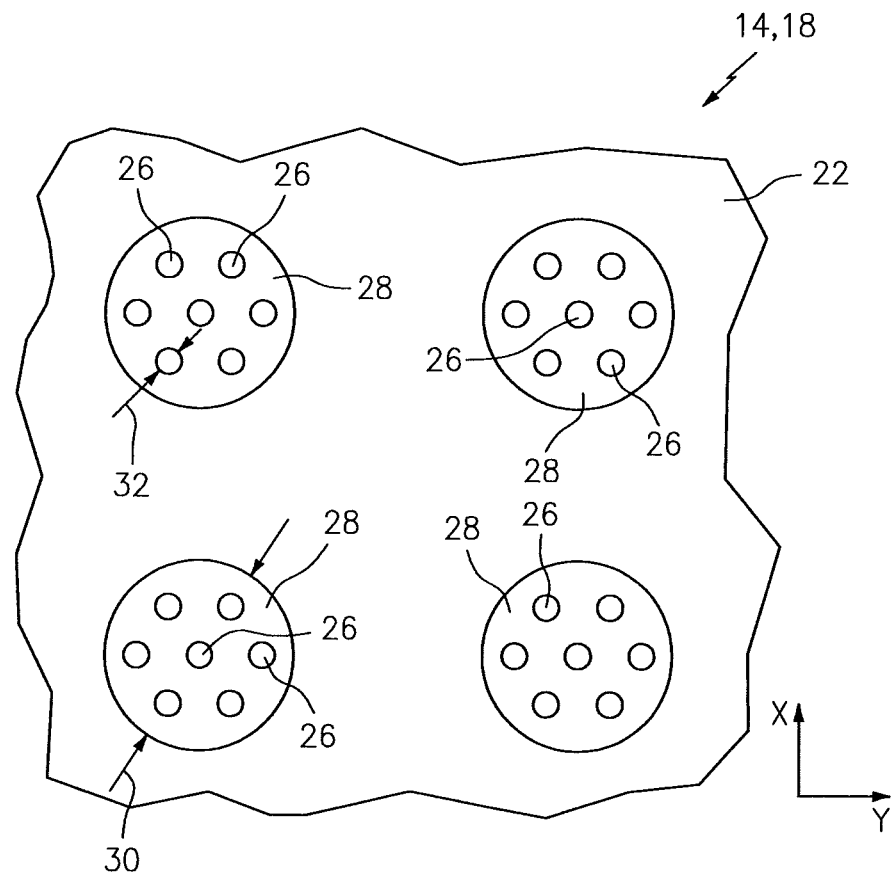
FIG. 3 is an interior view of the low pressure surface of the panel of FIG. 2.
Figure 7:
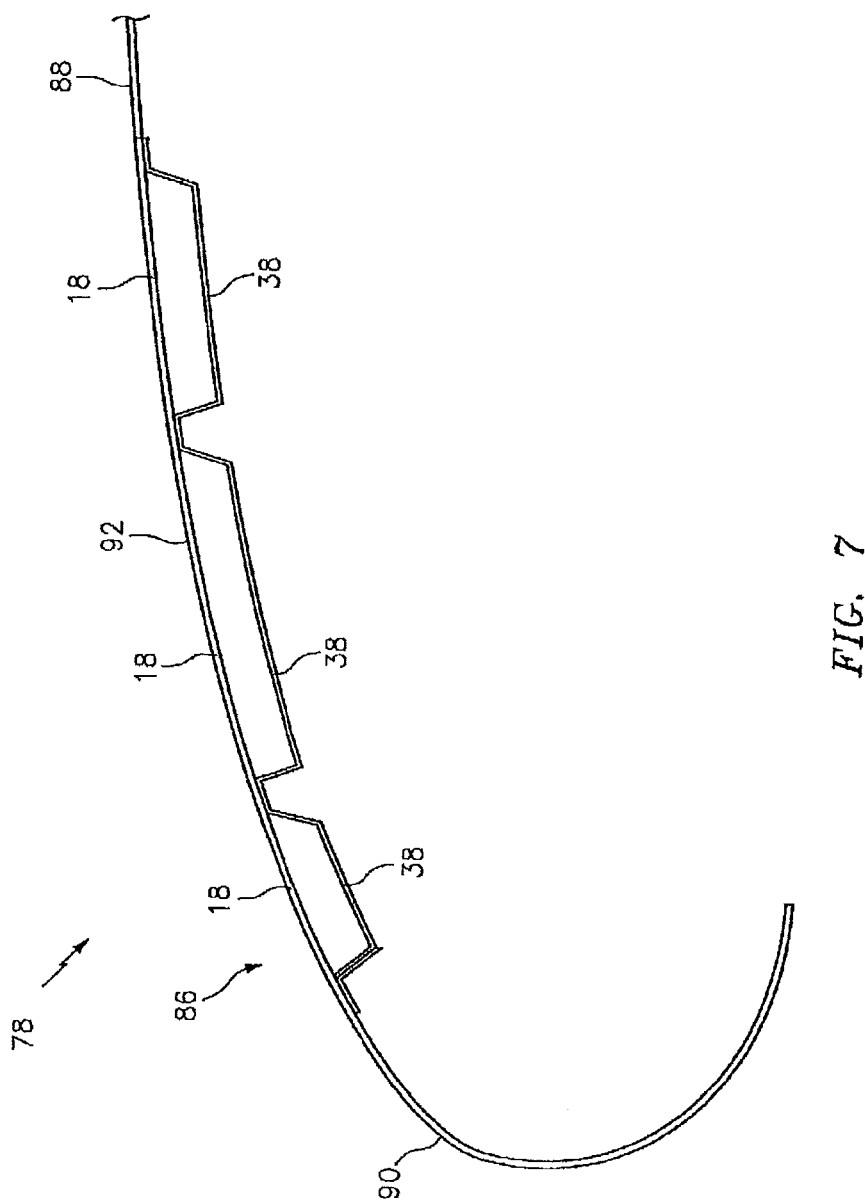
FIG. 7 is a sectional illustration of a portion of a nacelle for the propulsion system of FIG. 6.
Figure 8:
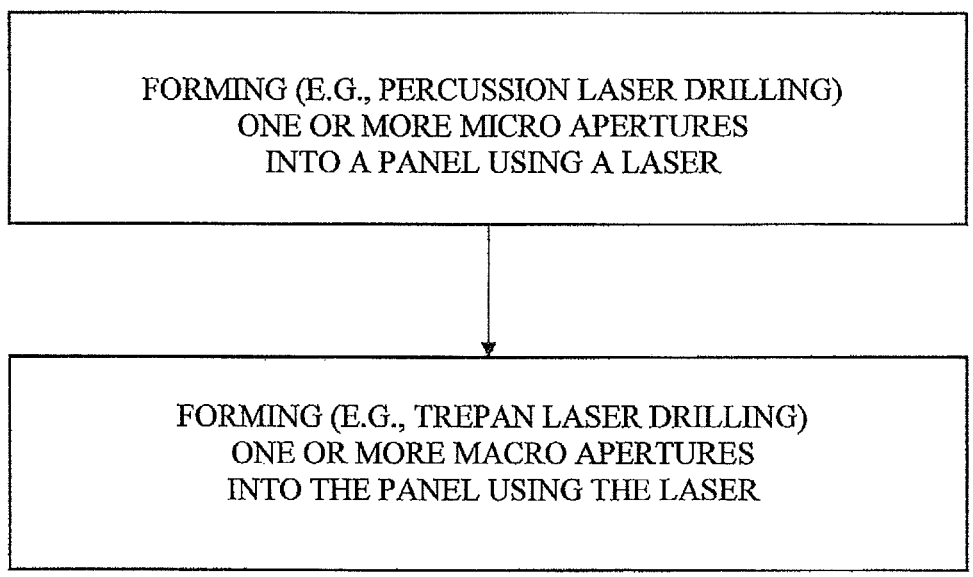
FIG. 8 is a flow diagram of a method for manufacturing an apparatus for promoting laminar flow.

The system 10 of FIG. 1 includes the body 14 and a subsystem 16 for providing a pressure differential across at least a portion of the body 14. Referring to FIGS. 2 and 3, the body 14 includes a fluid dynamic panel 18. The term "panel" may be used to describe a sheet-like structure with a lateral expanse (e.g., x-axis and/or y-axis) that is generally significantly larger than its thickness 20 (e.g., z-axis). Such a panel may be generally planar as illustrated in FIG. 1, or contoured as illustrated in FIG. 7.

The panel 18 extends along its thickness 20 (e.g., z-axis) between an interior first surface 22 and an exterior second surface 24; e.g., an exterior airflow surface. The panel 18 is configured with a plurality of micro apertures 26 and a plurality of macro apertures 28. The term "micro" may describe an aperture (e.g., a perforation) with a relatively smaller width (e.g., diameter). The term "macro" may describe an aperture (e.g., a perforation) with a relatively larger width (e.g., diameter). A lateral width 30 of each macro aperture, for example, may be about ten (10) times or more greater than lateral widths 32 of the micro apertures 26. More particularly, the macro aperture width 30 may be about 0.040 inches (~1.016 mm) and the micro aperture width 32 may be about 0.002 inches (~0.051 mm). The micro apertures 26 and the macro apertures 28 of the panel 18, however, are not limited to the foregoing exemplary dimensions.

Each of the micro apertures 26 extends into the panel 18 from the second surface 24. Each of the macro apertures 28 extends into the panel 18 from the first surface 22. Each of the macro apertures 28 is associated with and fluidly coupled with one or more (e.g., a set) of the micro apertures 26. Each set of the micro apertures 26, for example, may be laterally aligned with and extend into the panel 18 from the second surface 24 to a respective one of the macro apertures 28.

Referring again to FIG. 1, the pressure differential subsystem 10 may include a flow path 34 and a vacuum or lower pressure source 36 (e.g., pump). The flow path 34 may include at least one duct 38 connected to or included as part of the body 14. This duct 38 is configured to fluidly couple the apertures 26 and 28 to the vacuum source 36. In operation, the vacuum source 36 creates a pressure differential through the apertures 26 and 28 across the panel 14. Of course, various other means may be used for providing the pressure differential between the first surface 22 and the second surface 24. Flow path 34 may connect to a region of lower pressure air flow somewhere on the aircraft, at a trailing edge, for example, in order to provide a lower pressure source and create the pressure differential. With this configuration, during vacuum source 36 operation, at least a portion of boundary layer fluid may be drawn serially through the micro apertures 26 and then the macro apertures 28 and into the duct 38 towards the vacuum source 36. By drawing the boundary layer fluid, the system 10 may actively reduce boundary layer thickness or growth and thereby actively maintain laminar flow across the panel 18.

Figure 4:
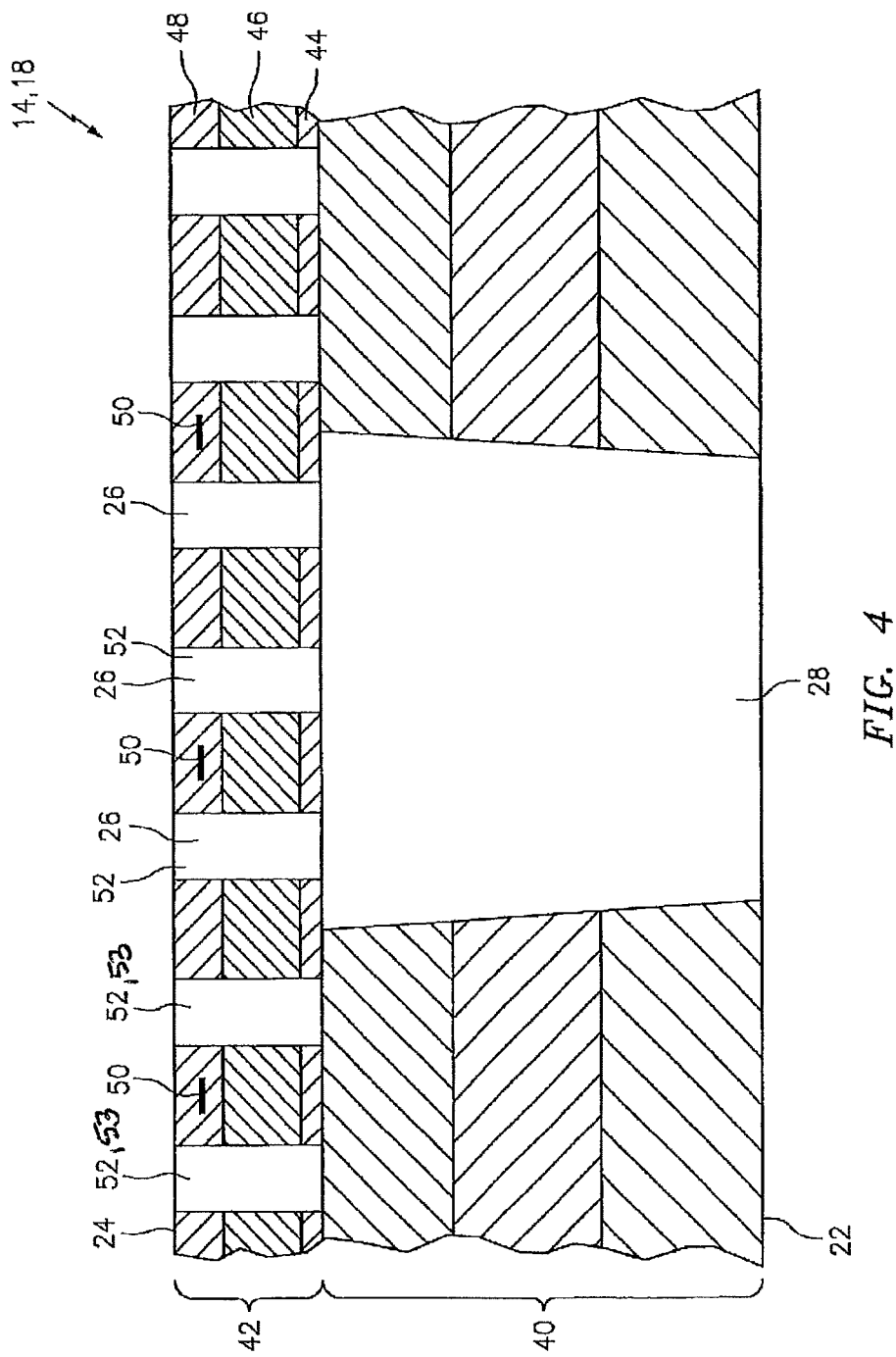
FIG. 4 is a more detailed sectional schematic illustration of a portion of the panel illustrated in FIG. 1 showing details of a composite ply layup.

EXEMPLARY, NON-LIMITING PANEL CONSTRUCTION: The panel 18 may be constructed from various materials including, but not limited to, composite materials and/or metals. For example, referring to FIG. 4, the panel 18 may include a first layer 40 (or panel portion) bonded or otherwise attached to a second layer 42 (or panel portion).

The first layer 40 may be a multi-ply laminate of woven and/or non-woven fibrous material within a resin matrix. Examples of the fibrous material include, but are not limited to, fiberglass, carbon fiber, Kevlar, or some combination thereof, as may be selected to suit the application by those of ordinary skill in this art. The resin matrix may be any suitable thermosetting or thermoplastic binder; e.g., epoxy or polyimide resin as two non-limiting examples. The first layer 40 may also or alternatively be constructed from non-fibrous material such as, but not limited to, acrylonitrile butadiene styrene (ABS) plastic, polyetherimide (e.g., Ultem®) and/or nylon. Other non-limiting first layer 40 materials include metals and other composite or engineered materials.

The first layer 40 may extend from the first surface 22 to (or towards) the second layer 42. One or more or each of the macro apertures 28 may be formed using a laser. This laser may form each of the macro apertures 28 utilizing a trepanning process. Of course, the macro apertures 28 may also be formed using one or more other processes such as mechanical drilling or punching.

In some embodiments, the macro apertures 28 may be formed in the first layer 40 before the second layer 42 is attached to the first layer 40. In other embodiments, the macro apertures 28 may be formed in the first layer 40 while or after the second layer 42 is attached to the first layer 40.

The second layer 42 may include an adhesive sub-layer 44, at least one sub-layer 46 of woven and/or non-woven fibrous material within a resin matrix, and a surface film 48. The second layer 42 may also include lightning strike protection 50 (e.g., copper or other metal mesh), which may be disposed with (e.g., encapsulated within or extending into) the surface film 48 or provided as a separate sub-layer.

The adhesive sub-layer 44 may be constructed by spraying or otherwise applying any suitable thermosetting or thermoplastic binder (e.g., epoxy resin) onto the first layer 40 on a side opposite the first surface 22. Next, the fibrous material may be impregnated with the resin matrix and disposed on the adhesive sub-layer 44 to provide the sub-layer 46. Next, the lightning strike protection 50 may be disposed on the sub-layer 46 and, simultaneously or subsequently (or prior to), the surface film 48 may be sprayed or otherwise applied to the lightning strike protection 50 and the sub-layer 46. Alternatively, the lightning strike protection 50 may be pre-disposed with the surface film 48, and disposed together on the sub-layer 46 as a sheet. With the foregoing configuration, the second layer 42 may extend from the second surface 24 to (or towards) the first layer 40.

Once the second layer 42 has been cured and/or bonded or otherwise attached to the first layer 40, the micro apertures 26 may be formed. One or more or each of the micro apertures 26 may be formed using a laser such as, but not limited to, a percussion laser; e.g., a laser configured for a percussion laser drilling process. Such a laser may generate and direct a high frequency of laser pulses onto the second layer 42 to perforate the second layer 42 and thereby form the micro apertures 26 (e.g., micro perforations) without a need for trepanning. The intensity and focal length of the laser may also be tailored to substantially prevent cutting into the first layer 40.

In some embodiments, the laser may direct the laser beam onto the second surface 24. In such embodiments, the laser may form a standardized grid or array of micro perforations 52 in the second layer 42. This ensures at least some of the micro perforations 52 are aligned with the macro apertures 28 and thereby form the micro apertures 26 without the need for mapping macro aperture 28 locations. Note, mapping macro aperture 28 locations may be time consuming and require expensive measurement equipment. Of course, in other embodiments, it may be desirable to map macro aperture 28 locations in order to only direct the laser beam onto locations aligned with the macro apertures 28. In this manner, the structural integrity of the second layer 42 may be increased and/or the second surface 24 may be provided with a smoother finish. The macro apertures 28 may be mapped by locating the macro apertures 28 relative to a coordinate system and/or using thermal or other detection imagery to sense the location of the macro apertures 28 and/or elements of the lightning strike protection 50 during or just prior to laser perforation.

In some embodiments, the laser may direct the laser beam onto a side of the second layer 42 opposite the second surface 24. For example, the laser beam may be directed through each macro aperture 28 onto the second layer 42. In this manner, dead ended ones of the micro-perforations 52 (e.g., 53 in FIG. 4) may be substantially eliminated and/or precise laser intensity and focal length may be less critical.

Of course, there are various other processes and formation sequences that may be used for constructing the panel 18 and its apertures 26 and 28 and the present disclosure is not limited to any particular ones thereof. For example, the second layer 42 may be perforated before being attached to the first layer 40. In another example, the macro apertures 28 may be formed after the second layer 42 is attached to the first layer 40. Furthermore, the panel 18 may be constructed from materials other than those described above. For example, the first layer 40 may be formed from a sheet of metal; e.g., aluminum or titanium. Similarly, the surface film or the entire second layer 42 may be formed from a sheet of metal; e.g., aluminum or titanium.

EXEMPLARY, NON-LIMITING APPARATUS APPLICATIONS: The body 14 may be configured as a component of an aircraft 53. For example, referring to FIG. 5, the panel 18 may be configured as a portion (e.g., exterior skin) of an aircraft fuselage 54, an aircraft wing 55, an aircraft stabilizer 56, an aircraft tail 57 or a propulsion system 58. More particularly, the panel 18 may be configured as a leading or forward portion of one of the aforementioned aircraft components 54-58, or any other portion forward of the aircraft component's trailing edge susceptible to the formation of turbulent flow over it.

Figure 5:
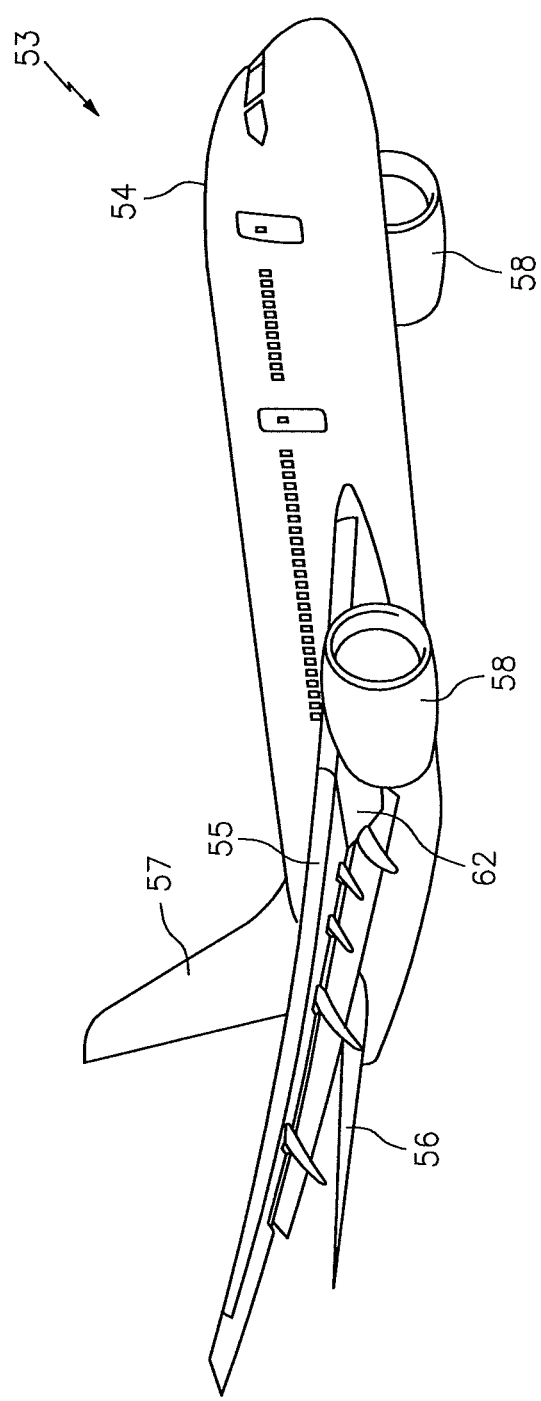
FIG. 5 is a perspective illustration of an aircraft.
Figure 6:
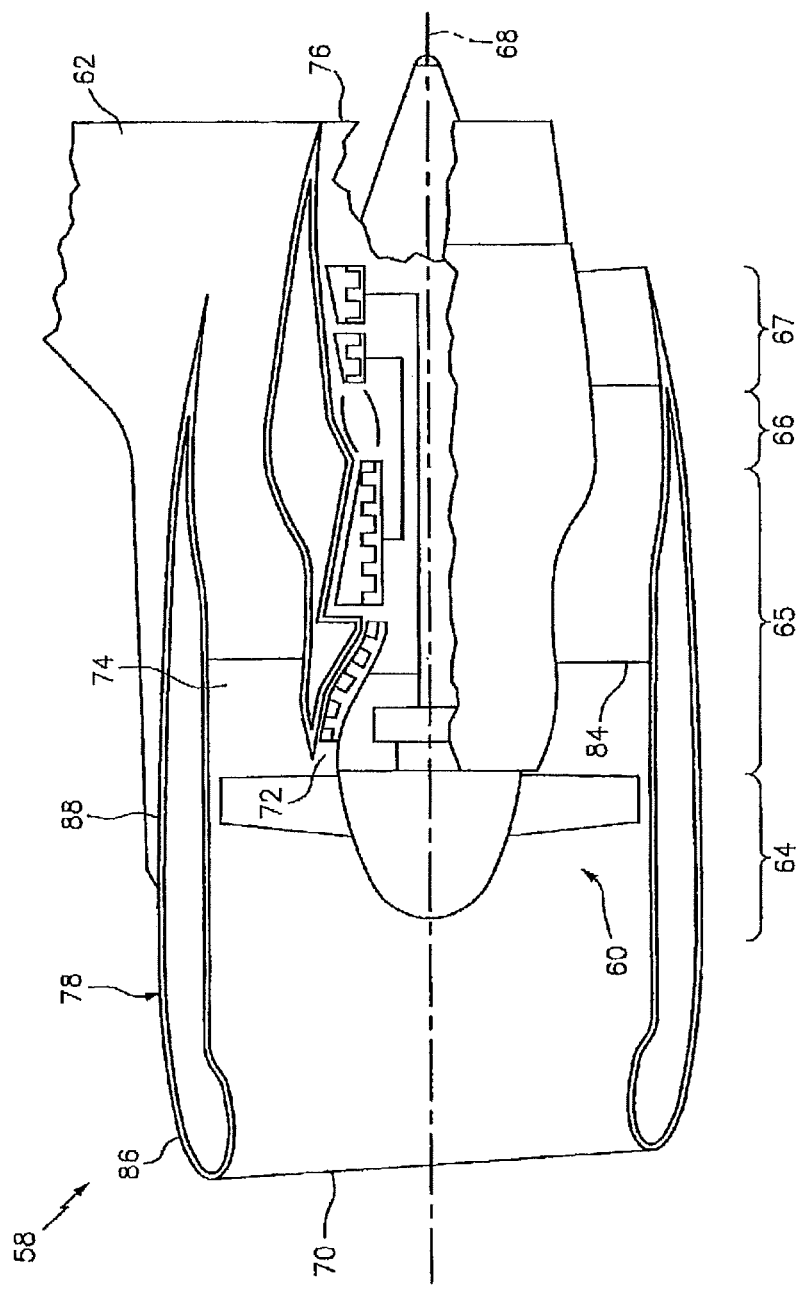
FIG. 6 is a cutaway schematic illustration of a turbine engine propulsion system for the aircraft of FIG. 5.

FIG. 6 is a side cutaway illustration of a turbofan turbine engine 60 configured as or included in the propulsion system 58. The turbine engine 60 is connected to an engine pylon 62, which may connect the turbine engine 60 to the aircraft 53. The engine pylon 62, for example, may connect the turbine engine 60 to the wing (or fuselage) of the aircraft 53 as shown in FIG. 5.

Still referring to FIG. 6, the turbine engine 60 includes a fan section 64 and a turbine engine core. The engine core includes a compressor section 65, a combustor section 66 and a turbine section 67. These engine sections 65-67 are arranged sequentially along an axial centerline 68 of the turbine engine 60 within an engine case. The compressor section 65 may include a low pressure compressor (LPC) section and a high pressure compressor (HPC) section. The turbine section 67 may include a high pressure turbine (HPT) section and a low pressure turbine (LPT) section.

During operation, air enters the turbine engine 60 through a forward, upstream inlet 70. This air is directed through the fan section 64 and into a core flowpath 72 and into a bypass flowpath 74. The air within the core flowpath 72 may be referred to as "core air". The air within the bypass flowpath 74 may be referred to as "bypass air". The core air is directed through the engine sections 65-67 and exits the turbine engine 60 through an aft, downstream core exhaust nozzle 76 to provide forward engine thrust. Within the combustor section 66, fuel is injected into and mixed with the core air and ignited to power the turbine section 67. The bypass air is directed through the bypass flowpath 74 and may exit the turbine engine 60 through an aft, downstream bypass exhaust nozzle to provide a majority of the forward engine thrust. Some or all of the bypass air may be selectively redirected by a thrust reverser (not shown) to exit the turbine engine 60 in a partly forward direction to provide reverse engine thrust.

The propulsion system 58 also includes a nacelle 78. The nacelle 78 is a system of components or structures attached to the turbine engine 60 and/or the engine pylon 62 which provides aerodynamic surfaces around the turbine engine 60, defines a portion of the bypass flowpath 74, defines an inlet for the core flowpath 72 and the bypass flowpath 74, defines appropriate nozzles for the bypass exhaust and the core exhaust, and houses or contains auxiliary devices for the engine and other components for the aircraft including various ducts, lines, pipes and wires.

The nacelle 78 may include an inlet 86 and a fan cowl 88 (which generally overlaps a fan case of the turbine engine 60). Referring to FIG. 7, the inlet 86 may include a nose lip 90 and an outer barrel 92, which is arranged and extends axially between the nose lip 90 and the fan cowl 88. The exterior skin of the outer barrel 92 may include or be configured from the panel 18 or multiple panels 18. In this manner, the system 10 of FIG. 1 may reduce boundary layer thickness or growth and thereby delay the development of turbulent flow across the axial extent of the forward end of the propulsion system 58. By reducing turbulence, the system 10 may increase propulsion system and aircraft efficiency.

The terms "forward", "aft", "upstream", "downstream", "inner" and "outer" are used to orientate the components of the assembly described above relative to the turbine engine 60 and its centerline. A person of skill in the art will recognize, however, one or more of these components may be utilized in other orientations than those described above. The present invention therefore is not limited to any particular spatial orientations.

The system 10 may be included in various turbine engines other than the one described above. The system 10, for example, may be included in a geared turbine engine where a gear train connects one or more shafts to one or more rotors in a fan section, a compressor section and/or any other engine section. Alternatively, the system 10 may be included in a turbine engine configured without a gear train. The system 10 may be included in a geared or non-geared turbine engine configured with a single spool, with two spools, or with more than two spools. The turbine engine may be configured as a turbojet engine or any other type of turbine engine. The present disclosure therefore is not limited to any particular types or configurations of turbine engines, propulsion systems, aircraft components or body 14 configurations as set forth above.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

We claim:

1. An apparatus for promoting laminar flow, the apparatus comprising:
   a panel comprising an interior surface, an exterior air flow surface, a plurality of macro apertures and a plurality of micro apertures, the panel extending between the interior surface and the exterior air flow surface;
   a first one of the macro apertures extending into the panel from the interior surface, wherein the first one of the macro apertures has a macro aperture height; and
   a first one of the micro apertures extending into the panel from the exterior air flow surface and fluidly coupled with the first one of the macro apertures, wherein the first one of the micro apertures has a micro aperture height;
   wherein the panel has a panel height that is substantially equal to a sum of the macro aperture height and the micro aperture height.

2. An apparatus for promoting laminar flow, the apparatus comprising:
   a panel comprising an interior surface, an exterior air flow surface, a plurality of macro apertures and a plurality of micro apertures;
   the panel extending between the interior surface and the exterior surface;
   a first of the macro apertures comprising a macro aperture boundary edge, and extending into the panel from the interior surface to the macro aperture boundary edge;
   a first of the micro apertures comprising a micro aperture boundary edge, and extending into the panel from the exterior air flow surface to the micro aperture boundary edge, wherein a first orifice formed by the micro aperture boundary edge is directly fluidly coupled with and adjacent a second orifice formed by the macro aperture boundary edge.

3. The apparatus of claim 2, wherein the panel further comprises a first layer attached directly to a second layer, the first one of the macro apertures extends through the first layer, and the first one of the micro apertures extends through the second layer.

4. The apparatus of claim 2, wherein a set of the micro apertures extend into the panel from the exterior air flow surface and are fluidly coupled with the first one of the macro apertures, and the set of the micro apertures include the first one of the micro apertures.

5. The apparatus of claim 2, wherein the first one of the macro apertures has a width that is at least ten times greater than a width of the first one of the micro apertures.

6. The apparatus of claim 2, further comprising a duct, wherein the first one of the macro apertures fluidly couples the first one of the micro apertures with the duct.

7. The apparatus of claim 2, further comprising a vacuum source configured to draw boundary layer fluid adjacent the exterior air flow surface serially through the first one of the micro apertures and the first one of the macro apertures.

8. The apparatus of claim 2, wherein the panel comprises composite material.

9. The apparatus of claim 2, wherein the panel comprises metal.

10. The apparatus of claim 3, wherein the first layer comprises a multi-ply laminate.

11. The apparatus of claim 3, wherein the second layer comprises fibrous material with a resin matrix.

12. The apparatus of claim 3, wherein the second layer comprises a surface film.

13. The apparatus of claim 3, wherein the second layer comprises lightning strike protection.

14. The apparatus of claim 2, wherein the panel is configured as a turbine engine propulsion system panel.

15. The apparatus of claim 2, wherein the panel is configured as a nacelle outer barrel panel.

16. The apparatus of claim 2, wherein the panel is configured as an aircraft panel.

* * * * *